(12) United States Patent
Fujita et al.

(10) Patent No.: US 7,498,067 B2
(45) Date of Patent: Mar. 3, 2009

(54) LIQUID CRYSTAL COMPOSITION AND LIQUID CRYSTAL DISPLAY DEVICE

(75) Inventors: Atsuko Fujita, Ichihara (JP); Hiroaki Fujita, Ichihara (JP); Norikatsu Hattori, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 11/723,147

(22) Filed: Mar. 16, 2007

(65) Prior Publication Data

US 2007/0221881 A1     Sep. 27, 2007

(30) Foreign Application Priority Data

Mar. 23, 2006   (JP)   .............................. 2006-080456

(51) Int. Cl.
*C09K 19/34* (2006.01)
*C09K 19/32* (2006.01)
*C09K 19/30* (2006.01)
*C09K 19/12* (2006.01)

(52) U.S. Cl. .............. 428/1.1; 252/299.61; 252/299.62; 252/299.63; 252/299.66

(58) Field of Classification Search .................. 428/1.1; 252/299.61, 299.62, 299.63, 299.66
See application file for complete search history.

(56) References Cited

U.S. PATENT DOCUMENTS 6,329,027 B1 * 12/2001 Kondo et al. ................. 428/1.1
2005/0247910 A1   11/2005 Sugiura et al.

FOREIGN PATENT DOCUMENTS

| EP | 1 640 433 A1 | 3/2006 |
|---|---|---|
| JP | 2005-035986 | 2/2005 |
| JP | 2005-105132 | 4/2005 |
| JP | 2005-281560 | 10/2005 |
| WO | 2005-000995 | 1/2005 |

OTHER PUBLICATIONS

English translation by computer for JP 2005-281560, http://www4.ipdl.inpit.go.jp/Tokujitu/PAJdetail.ipdl?N0000=60&N0120=01&N2001=2&N3001=2005-281560.*

* cited by examiner

*Primary Examiner*—Shean C Wu
(74) *Attorney, Agent, or Firm*—Hogan & Hartson LLP

(57) ABSTRACT

A liquid crystal composition having a negative dielectric anisotropy and including a first component, which is a liquid crystal compound having a chroman ring, in which two hydrogens are replaced by fluorine, a second component, which is a liquid crystal compound having phenylene in which two hydrogens are replaced by fluorine and chlorine, and a particular third component, and a liquid crystal display device including the liquid crystal composition.

10 Claims, No Drawings

LIQUID CRYSTAL COMPOSITION AND LIQUID CRYSTAL DISPLAY DEVICE

CROSS REFERENCE TO RELATED APPLICATIONS

This application claims priority under 35 U.S.C. § 119 to Japanese Patent Application No. JP 2006-080456, filed Mar. 23, 2006, which is expressly incorporated herein by reference in its entirety.

BACKGROUND OF THE INVENTION

1. Field of the Invention

The invention relates to a liquid crystal composition and a liquid crystal display device. More specifically, the invention relates to a liquid crystal composition suitable for use in a liquid crystal display device driven in an AM (active matrix) mode, and a liquid crystal display device containing the composition.

2. Related Art

A liquid crystal display device (which is a generic term for a liquid crystal display device, a liquid crystal display panel and a liquid crystal display module) utilizes optical anisotropy, dielectric anisotropy and so forth of a liquid crystal composition, and as an operating mode of the liquid crystal display device, such various modes include a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode, and so forth. Among these operating modes, it has been known that an ECB mode, an IPS mode, a VA mode and so forth are capable of being improved in viewing angle, while the conventional modes, such as a TN mode, an STN mode and so forth, have a problem therein. A liquid crystal composition having a negative dielectric anisotropy can be used in a liquid crystal display device of these modes.

As a liquid crystal composition having a negative dielectric anisotropy capable of being used in a liquid crystal display device of these modes, such compositions have been variously studied that contain a liquid crystal compound having 2,3-difluorophenylene, in which hydrogen on a benzene ring is replaced by fluorine.

The liquid crystal compound is a generic term for a compound having a liquid crystal phase such as a nematic phase, a smectic phase and so forth, and also for a compound having no liquid crystal phase but being useful as a component of a composition. The content ratio of the component is calculated based on the total weight of the liquid crystal composition. The liquid crystal compound herein is a compound represented by formula (A). The compound may be an optically active compound.

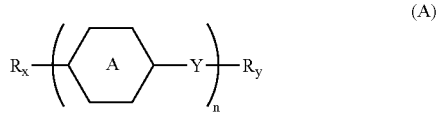

(A)

In formula (A), $R_x$ and $R_y$ are each independently a hydrogen, alkyl, alkoxy, alkoxyalkyl, alkoxyalkoxy, acyloxy, acyloxyalkyl, alkoxycarbonyl, alkoxycarbonylalkyl, alkenyl, alkenyloxy, alkenyloxyalkyl, alkoxyalkenyl, alkynyl, alkynyloxy, cyano, —NCS, fluorine or chlorine. These groups have approximately 10 or less carbons. In the group having approximately 1 to approximately 5 carbons, arbitrary hydrogen may be replaced by fluorine or chlorine, and the total number of the replaced fluorine and chlorine is approximately 1 to approximately 11. In formula (A), ring A is 1,4-cyclohexylene, 1,4-phenylene, pyrane-2,5-diyl, 1,3-dioxane-2,5-diyl, pyridine-2,5-diyl, pyrimidine-2,5-diyl, decahydronaphthalene-2,6-diyl, 1,2,3,4-tetrahydronaphthalene-2,6-diyl or naphthalene-2,6-diyl. In ring A, arbitrary hydrogen may be replaced by fluorine or chlorine. In ring A, the total number of the replaced fluorine and chlorine is approximately 1 to approximately 4. In the 1,4-phenylene, arbitrary one or two hydrogens may be replaced by cyano, methyl, difluoromethyl or trifluoromethyl. In formula (A), Y represents a single bond, —(CH$_2$)$_2$—, —COO—, —OCO—, —CH$_2$O—, —OCH$_2$—, —CF$_2$O—, —OCF$_2$—, —CH=CH—, —CF=CF—, —(CH$_2$)$_4$—, —(CH$_2$)$_3$—O—, —O—(CH$_2$)$_3$—, —CH=CH—(CH$_2$)$_2$—, —(CH$_2$)$_2$—CH=CH—, —(CH$_2$)$_2$CF$_2$O—, —OCF$_2$(CH$_2$)$_2$—, —(CH$_2$)$_2$COO—, —(CH$_2$)$_2$OCO—, —COO(CH$_2$)$_2$—, —OCO(CH$_2$)$_2$—, —CH=CH—COO—, —CH=CH—OCO—, —COO—CH=CH— or —OCO—CH=CH—. In formula (A), n represents 1, 2, 3 or 4.

JP 2005-35986 A and International Publication No. 2005/000995 disclose examples of a compound having a chroman ring and a composition containing the compound. JP 2005-105132 and JP 2005-281560 A disclose a liquid crystal composition containing a compound having a chroman ring, which is the first component of the invention. The compositions disclosed in these publications do not consider the combination of the first component and the second component of the inventions and have room for improvement.

A liquid crystal display device having such an operating mode as an IPS mode and a VA mode still has a problem as a display device as compared to CRT, and it is desirable to improve the characteristics thereof.

The liquid crystal display device driven in an IPS mode or a VA mode is constituted mainly by a liquid crystal composition having a negative dielectric anisotropy. In order to further improve the characteristics, the liquid crystal composition preferably has the following characteristics (1) to (5), i.e., (1) a wide temperature range of a nematic phase, (2) a low viscosity, (3) a suitable optical anisotropy, (4) a large absolute value of dielectric anisotropy, and (5) a large specific resistance.

The temperature range of a nematic phase relates to the temperature range where the liquid crystal display device is used, and a liquid crystal display device containing a liquid crystal composition having a wide temperature range of a nematic phase as in item (1) has a wide temperature range where the liquid crystal display device can be used.

A liquid crystal display device containing a liquid crystal composition having a small viscosity as in item (2) has a short response time. A liquid crystal display device having a short response time can be favorably used for displaying a moving image. Furthermore, upon injecting the liquid crystal composition into a liquid crystal cell of the liquid crystal display device, the injection time can be reduced to improve the workability.

A liquid crystal display device containing a liquid crystal composition having a suitable optical anisotropy as in item (3) has a large contrast. A liquid crystal composition having an optical anisotropy that is smaller than a conventional liquid crystal composition is favorable for a liquid crystal display device having a large cell gap or a liquid crystal display device of a reflection type.

A liquid crystal display device containing a liquid crystal composition having a large absolute value of dielectric anisotropy as in item (4) reduces the threshold voltage, decreases the driving voltage, and reduces the electric power consumption.

A liquid crystal display device containing a liquid crystal composition having a large specific resistance as in item (5) increases the voltage holding ratio and increases the contrast ratio. Therefore, a liquid crystal composition having a large specific resistance in the initial stage and has a large specific resistance even after using it for a long period of time is preferred.

SUMMARY OF THE INVENTION

The invention concerns a liquid crystal composition having a negative dielectric anisotropy and including three components, wherein the first component is at least one compound selected from the group of compounds represented by Formula (1), the second component is at least one compound selected from the group of compounds represented by Formulas (2-a), (2-b) and (2-c), and the third component is at least one compound selected from the group of compounds represented by Formula (3):

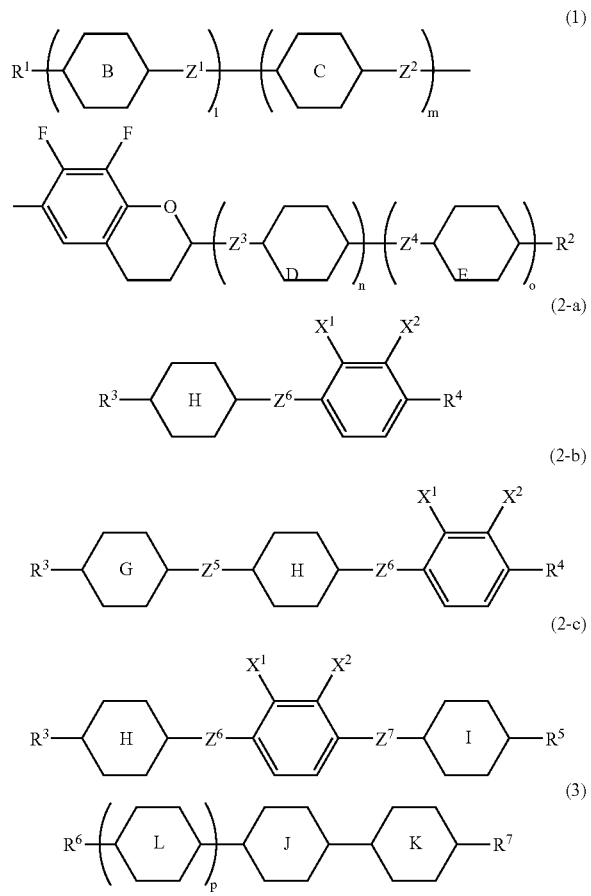

wherein $R^2$, $R^3$ and $R^6$ are each independently alkyl or alkenyl; $R^1$, $R^4$, $R^5$ and $R^7$ are each independently alkyl, alkenyl, or alkoxy; Ring B, ring C, ring D, ring E, ring G, ring H, ring I and ring L are independently 1,4-cyclohexylene or 1,4-phenylene; Ring J and ring K are each independently 1,4-cyclohexylene, 1,4-phenylene, 2-fluoro-1,4-phenylene, or 3-fluoro-1,4-phenylene; $Z^1, Z^2, Z^3, Z^4, Z^5, Z^6$ and $Z^7$ are each independently a single bond, —$(CH_2)_2$—, —$CH_2O$—, or —$OCH_2$—; one of $X^1$ and $X^2$ is independently fluorine, and the other thereof is independently chlorine; and l, m, n, o and p are each independently 0 or 1, provided that l+m+n+o is 1 or 2.

The invention also relates to a liquid crystal display device that includes the liquid crystal composition, and so forth.

DETAILED DESCRIPTION OF THE INVENTION

An advantage of the invention is to provide a liquid crystal composition that has a wide temperature range of a nematic phase, a large specific resistance, a small optical anisotropy and a negatively large dielectric anisotropy. Another advantage of the invention is to provide a liquid crystal composition that has a low minimum temperature of a nematic phase and also satisfies the aforementioned characteristics. Still another advantage of the invention is to provide a liquid crystal display device that contains the composition, has a large voltage holding ratio and is driven by an active matrix (AM) mode suitable for a VA mode, an IPS mode and so forth.

It has been found that a particular liquid crystal composition including a first component, which is a liquid crystal compound having a chroman ring, in which two hydrogens are replaced by fluorine, a second component, which is a liquid crystal compound having phenylene, in which two hydrogens are replaced by fluorine and chlorine, and a particular third component has a wide temperature range of a nematic phase and a large specific resistance, and the liquid crystal composition of the invention can decrease the optical anisotropy and can increase the negative dielectric anisotropy.

The invention includes:

1. A liquid crystal composition having a negative dielectric anisotropy and comprising three components, wherein the first component is at least one compound selected from the group of compounds represented by Formula (1), the second component is at least one compound selected from the group of compounds represented by Formulas (2-a), (2-b) and (2-c), and the third component is at least one compound selected from the group of compounds represented by Formula (3):

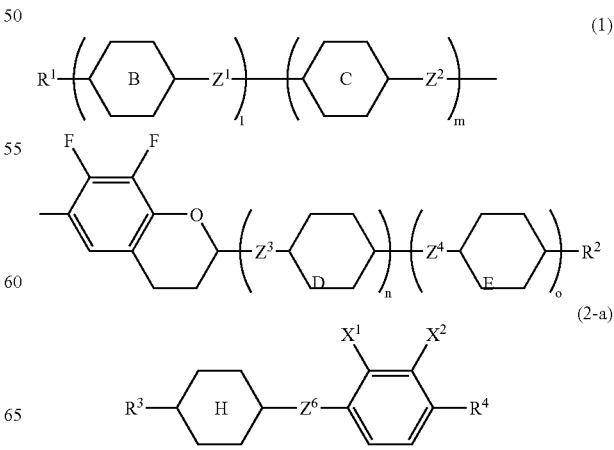

wherein $R^2$, $R^3$ and $R^6$ are each independently alkyl or alkenyl; $R^1$, $R^4$, $R^5$ and $R^7$ are each independently alkyl, alkenyl, or alkoxy; Ring B, ring C, ring D, ring E, ring Q ring H, ring I and ring L are each independently 1,4-cyclohexylene or 1,4-phenylene; Ring J and ring K are each independently 1,4-cyclohexylene, 1,4-phenylene, 2-fluoro-1,4-phenylene, or 3-fluoro 1,4-phenylene; $Z^1$, $Z^2$, $Z^3$, $Z^4$, $Z^5$, $Z^6$ and $Z^7$ are each independently a single bond, —$(CH_2)_2$—, —$CH_2O$—, or —$OCH_2$—; one of $X^1$ and $X^2$ is independently fluorine, and the other thereof is independently chlorine; and l, m, n, o and p are each independently 0 or 1, provided that l+m+n+o is 1 or 2.

2. The liquid crystal composition according to item 1, wherein the first component is at least one compound selected from the group of compounds represented by Formulas (1-1) to (1-11):

wherein $R^2$ is independently alkyl or alkenyl; and $R^1$ is independently alkyl, alkenyl, or alkoxy.

3. The liquid crystal composition according to item 1 or 2, wherein the second component is at least one compound selected from the group of compounds represented by Formulas (2-1) to (2-10):

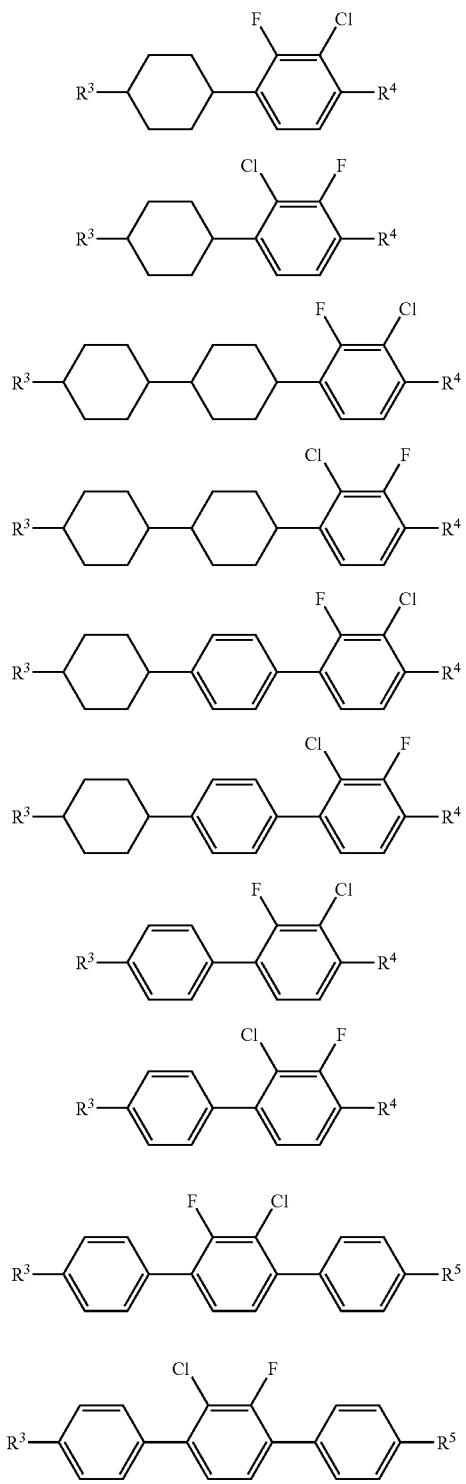

wherein $R^3$ is independently alkyl or alkenyl; and $R^4$ and $R^5$ are each independently alkyl, alkenyl, or alkoxy.

4. The liquid crystal composition according to any one of items 1 to 3, wherein the third component is at least one compound selected from the group of compounds represented by Formulas (3-1) to (3-6):

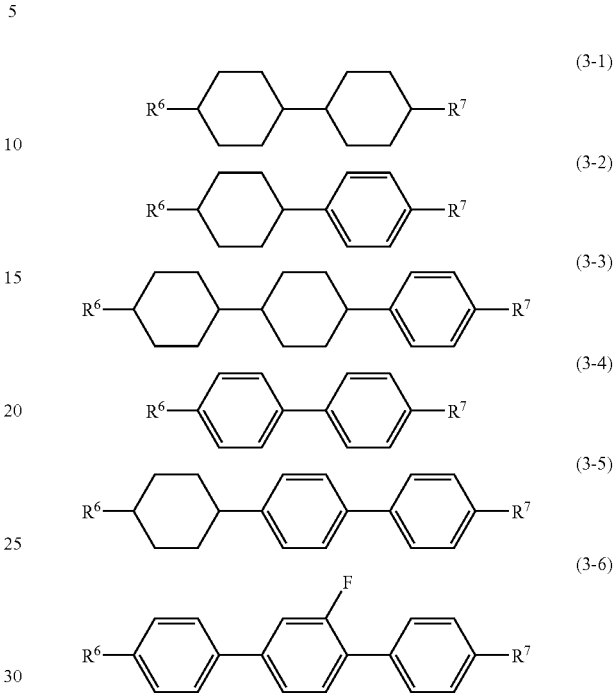

wherein $R^6$ is independently alkyl or alkenyl; and $R^7$ is independently alkyl, alkenyl, or alkoxy.

5. A liquid crystal composition having a negative dielectric anisotropy and including three components, wherein the first component is at least one compound selected from the group of compounds represented by Formulas (1-1) to (1-11) in item 2, the second component is at least one compound selected from the group of compounds represented by Formulas (2-1) to (2-10) in item 3, and the third component is at least one compound selected from the group of compounds represented by Formulas (3-1) to (3-6) in item 4.

6. A liquid crystal composition having a negative dielectric anisotropy and comprising three components, wherein the first component is at least one compound selected from the group of compounds represented by Formulas (1-1) to (1-4) in item 2, the second component is at least one compound selected from the group of compounds represented by Formulas (2-1) to (2-6) in item 3, and the third component is at least one compound selected from the group of compounds represented by Formulas (3-1) to (3-3) in item 4.

7. The liquid crystal composition according to any one of items 1 to 4, wherein the content ratio of the first component is from approximately 2% to approximately 40% by weight, the content ratio of the second component is from approximately 10% to approximately 80% by weight, and the content ratio of the third component is from approximately 5% to approximately 60% by weight, based on the total weight of the liquid crystal compounds.

8. The liquid crystal composition according to any one of items 1 to 6, wherein the liquid crystal composition further includes at least one compound selected from the group of compounds represented by Formulas (4-1) to (4-3) as a fourth component in addition to the first component, the second component and the third component:

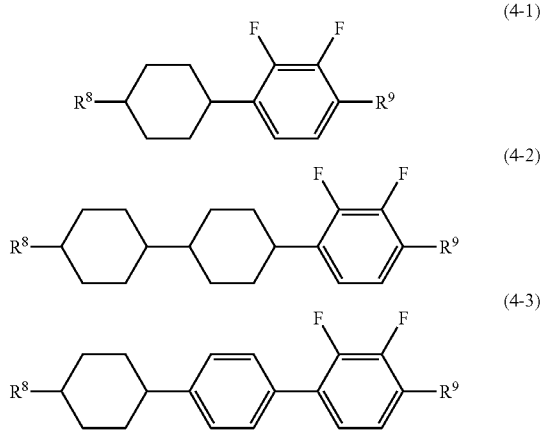

wherein R⁸ is independently alkyl or alkenyl; and R⁹ is independently alkyl, alkenyl, or alkoxy.

9. A liquid crystal composition having a negative dielectric anisotropy and including four components, wherein the first component is at least one compound selected from the group of compounds represented by Formulas (1-1) to (1-4) in item 2, the second component is at least one compound selected from the group of compounds represented by Formulas (2-1) to (2-4) in item 3, the third component is at least one compound selected from the group of compounds represented by Formulas (3-1) to (3-3) in item 4, and the fourth component is at least one compound selected from the group of compounds represented by Formulas (4-1) and (4-2) in item 8.

10. The liquid crystal composition according to item 8 or 9, wherein the content ratio of the first component is from approximately 2% to approximately 40% by weight, the content ratio of the second component is from approximately 10% to approximately 70% by weight, the content ratio of the third component is from approximately 5% to approximately 60% by weight and the content ratio of the fourth component is from approximately 5% to approximately 70% by weight, based on the total weight of the liquid crystal compounds.

11. The liquid crystal composition according to any one of items 1 to 10, wherein the composition has an optical anisotropy in the range of from approximately 0.05 to approximately 0.12.

12. The liquid crystal composition according to any one of items 1 to 11, wherein the composition has a dielectric anisotropy in the range of from approximately −6.5 to approximately −2.0.

13. A liquid crystal display device including the liquid crystal composition according to any one of items 1 to 12.

14. The liquid crystal display device according to item 13, wherein the liquid crystal display device has an operation mode of a VA mode or an IPS mode, and is driven in an active matrix mode.

The liquid crystal composition of the invention has a wide temperature range of a nematic phase and a large specific resistance. The liquid crystal composition of the invention can decrease the optical anisotropy and can increase the negative dielectric anisotropy. The composition is properly balanced among the characteristics. The liquid crystal composition of the invention can preferably have an optical anisotropy in the range of from approximately 0.05 to approximately 0.12 and a dielectric anisotropy in the range of from approximately −6.5 to approximately −2.0. The liquid crystal display device of the invention contains the liquid crystal composition and has a high voltage holding ratio. The liquid crystal display device contains the composition having the aforementioned characteristics and thus can be suitably used as a liquid crystal display device driven in an active matrix (AM) mode (hereinafter, sometimes referred to as an AM device) having an operation mode such as a VA mode and an IPS mode.

The liquid crystal composition of the invention contains a first component, which is a liquid crystal compound having a chroman ring, in which two hydrogens are replaced by fluorine, and a second component, which is a liquid crystal compound having phenylene, in which two hydrogens are replaced by fluorine and chlorine, and optionally contains a third component and a fourth component, which are liquid crystal compound having particular structures.

With respect to the components, the structures of the compounds used in the components, the characteristics and effects of the components, and specific examples and preferred examples of the components are described below.

First Component

The liquid crystal compound as the first component of the liquid crystal composition of the invention is at least one liquid crystal compound selected from the group of compounds represented by Formula (1) and has a chroman ring, in which two hydrogens are replaced by fluorine.

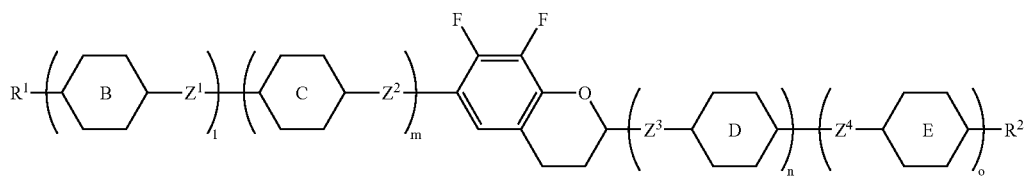

In formula (1), $R^1$, $R^2$, ring B, ring C, ring D, ring E, $Z^1$, $Z^2$, $Z^3$, $Z^4$, l, m, n and o are each independently defined as follows:

$R^1$ is independently alkyl, alkenyl, or alkoxy, $R^2$ is independently alkyl or alkenyl.

Among the alkyl, alkyl having approximately 1 to approximately 12 carbons is preferred, alkyl having approximately 1 to approximately 10 carbons is more preferred, methyl, ethyl, propyl, butyl, pentyl, hexyl, heptyl and octyl are further preferred, and ethyl, propyl, butyl, pentyl and heptyl are particularly preferred.

Among the alkenyl, alkenyl having approximately 2 to approximately 12 carbons is preferred, alkenyl having approximately 2 to approximately 10 carbons is more preferred, vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl and 5-hexenyl are further preferred, and vinyl, 1-propenyl, 3-butenyl and 3-pentenyl are particularly preferred.

In the case where $R^1$ or $R^2$ is the alkenyl, the steric configuration of —CH=CH— in the alkenyl depends on the position of the double bond. In the case where $R^1$ or $R^2$ is a group having a double bond starting from a carbon with an odd position number, such as 1-propenyl, 1-butenyl, 1-pentenyl, 1-hexenyl, 3-pentenyl, 3-hexenyl or 5-hexenyl, a trans configuration is preferred. In the case where $R^1$ or $R^2$ is a group having a double bond starting from a carbon with an even position number, such as 2-propenyl, 2-butenyl, 2-pentenyl, 4-pentenyl, 2-hexenyl or 4-hexenyl, a cis configuration is preferred.

Among the alkoxy, alkoxy having approximately 1 to approximately 12 carbons is preferred, alkoxy having approximately 1 to approximately 10 carbons is more preferred, methoxy, ethoxy, propoxy, butoxy, penthyloxy, hexyloxy and heptyloxy are further preferred, and methoxy, ethoxy and butoxy are particularly preferred.

Ring B, ring C, ring D and ring E are each independently 1,4-cyclohexylene or 1,4-phenylene.

$Z^1$, $Z^2$, $Z^3$ and $Z^4$ are each independently a single bond, —(CH$_2$)$_2$—, —CH$_2$O—, or —OCH$_2$—.

l, m, n and o are each independently 0 or 1, provided that l+m+n+o is 1 or 2.

The compounds represented by Formula (1) have a chroman ring, in which two hydrogens are replaced by fluorine. The liquid crystal composition of the invention has a high maximum temperature of a nematic phase and a large negative dielectric anisotropy owing to the structure of the liquid crystal compound as the first component. The compound as the first component of the invention has a large negative dielectric anisotropy as compared to a liquid crystal compound having a benzene ring, in which two hydrogens are replaced by halogen, as the second component and the fourth component described later. Accordingly, the liquid crystal composition including the first component can have a large negative dielectric anisotropy.

Among the liquid crystal compounds represented by Formula (1), compounds represented by Formulas (1-1) to (1-11) are preferred.

(1-1)

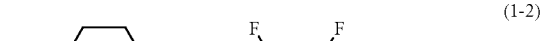
(1-2)

(1-3)

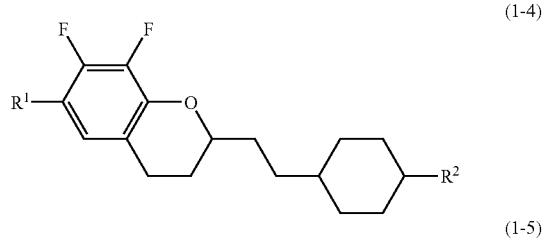
(1-4)

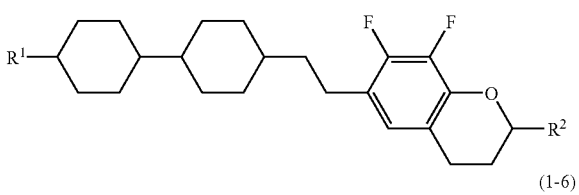
(1-5)

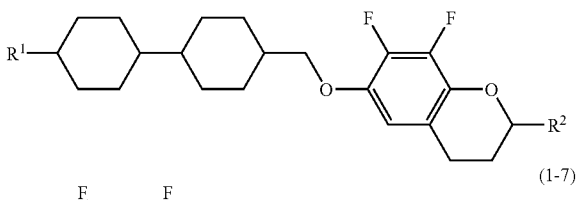
(1-6)

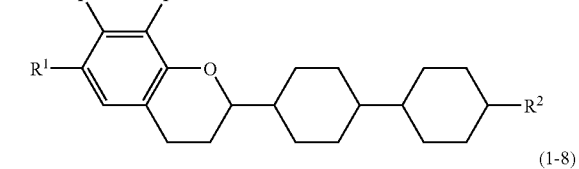
(1-7)

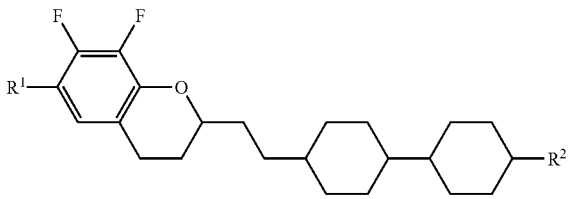
(1-8)

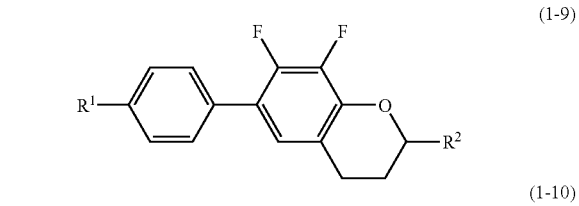
(1-9)

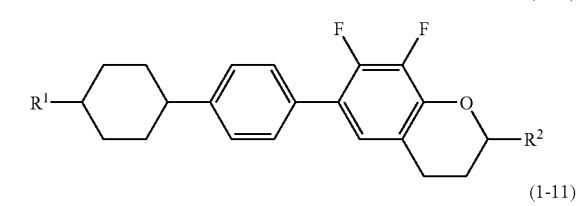
(1-10)

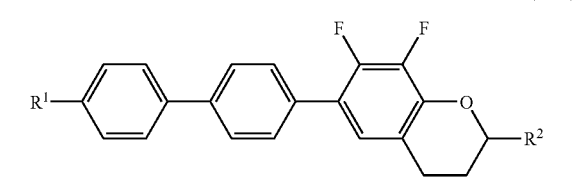
(1-11)

Among these compounds, the compounds represented by Formulas (1-1) to (1-8) are more preferred since the optical anisotropy of the liquid crystal composition can be decreased.

Among these compounds, the compounds represented by Formulas (1-1) to (1-4) are more preferred since the minimum temperature of a nematic phase of the liquid crystal composition can be decreased.

The liquid crystal compounds may be used as the first component solely or in combination of plural kinds thereof.

Second Component

The liquid crystal compound as the second component of the liquid crystal composition of the invention is at least one liquid crystal compound selected from the group of compounds represented by Formulas (2-a) to (2-c).

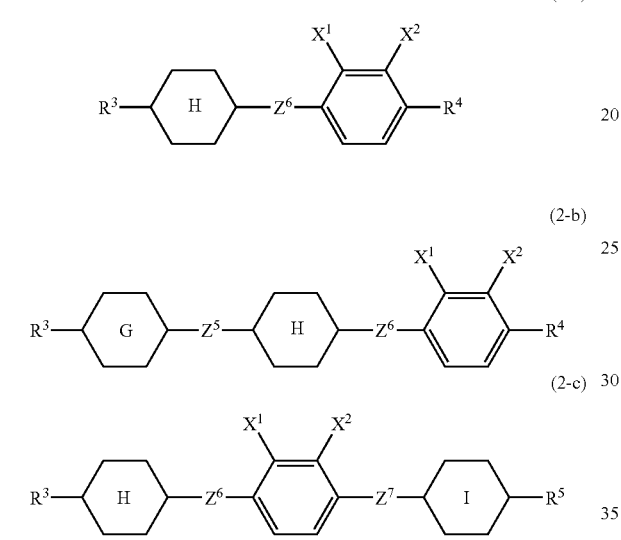

In Formulas (2-a) to (2-c), $R^3$, $R^4$, $R^5$, ring G, ring H, ring I, $Z^5$, $Z^6$, $Z^7$, $X^1$ and $X^2$ are each independently defined as follows.

$R^3$ is independently alkyl or alkenyl, and $R^4$ and $R^5$ are each independently alkyl, alkenyl, or alkoxy. Preferred embodiments of alkyl, alkenyl and alkoxy for $R^3$, $R^4$ and $R^5$ are the same as in $R^1$ and $R^2$.

Ring G, ring H and ring I are each independently 1,4-cyclohexylene or 1,4-phenylene. In the case where the ring contained in the compounds represented by Formulas (2-a) to (2-c) is 1,4-cyclohexylene, the steric configuration thereof is preferably a trans configuration.

$Z^5$, $Z^6$ and $Z^7$ are each independently a single bond, —(CH$_2$)$_2$—, —CH$_2$O—, or —OCH$_2$—.

One of $X^1$ and $X^2$ is independently fluorine, and the other thereof is independently chlorine.

The compounds represented by formulas (2-a) to (2-c) have 1,4-phenylene, in which one of hydrogens at 2-position and 3-position is replaced by fluorine, and the other thereof is replaced by chlorine. The liquid crystal composition of the invention has a large negative dielectric anisotropy owing to the structure of the liquid crystal compound as the second component.

Among the liquid crystal compounds represented by Formulas (2-a) to (2-c), compounds represented by Formulas (2-1) to (2-10) are preferred.

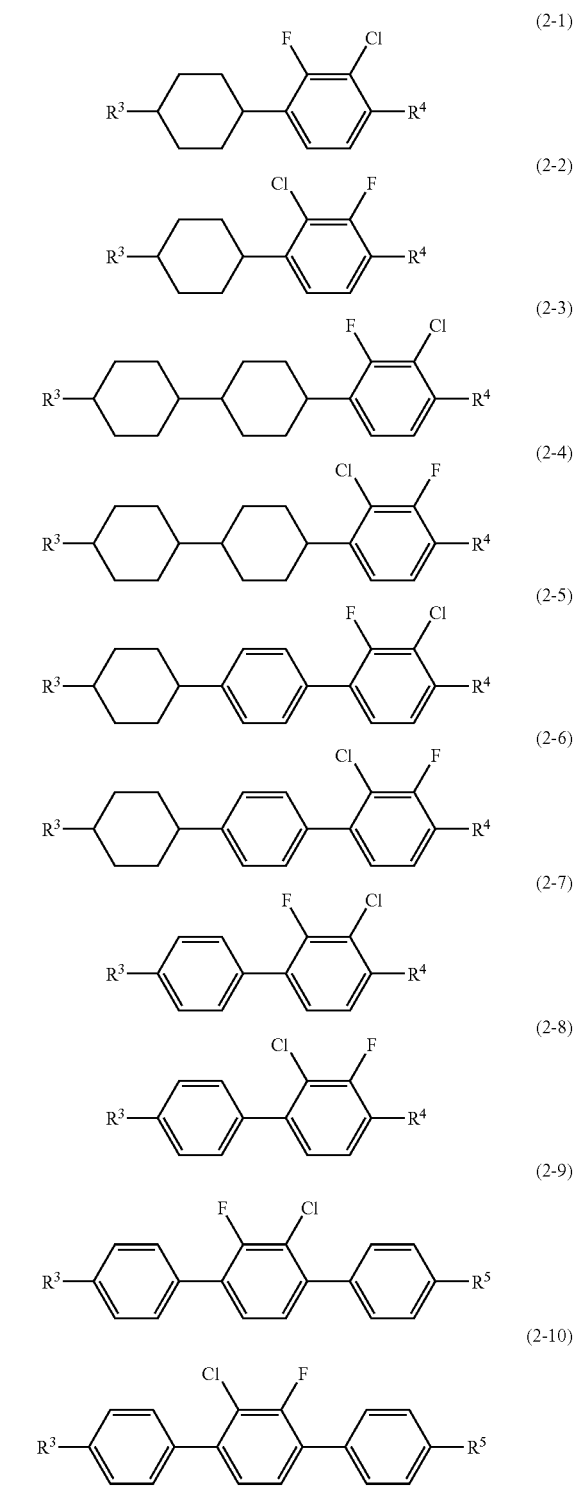

In the case where the second component is one of the aforementioned compounds, the liquid crystal composition has a low minimum temperature of a nematic phase and a large negative dielectric anisotropy, and can be easily controlled in optical anisotropy. In particular, the dielectric anisotropy can be negatively large in the case where $R^4$ is alkoxy.

Among these compounds, the compounds represented by Formulas (2-1) to (2-6) are more preferred since the optical anisotropy of the liquid crystal composition can be easily controlled. Among these compounds, the compounds represented by Formulas (2-1) to (2-4) are more preferred since the optical anisotropy of the liquid crystal composition can be decreased.

The second component used in the liquid crystal composition of the invention may be one compound represented by Formulas (2-a) to (2-c), wherein $X^1$ is chlorine, and $X^2$ fluorine, and two or more compounds represented by formulas (2-a) to (2-c), wherein $X^1$ is chlorine, and $X^2$ fluorine.

The second component used in the liquid crystal composition of the invention may be one compound represented by Formulas (2-a) to (2-c), wherein $X^1$ is fluorine, and $X^2$ chlorine, and two or more compounds represented by Formulas (2-a) to (2-c), wherein $X^1$ is fluorine, and $X^2$ chlorine.

The second component used in the liquid crystal composition of the invention may be a mixture of a compound represented by Formulas (2-a) to (2-c), wherein $X^1$ is chlorine, and $X^2$ fluorine, and a compound represented by Formulas (2-a) to (2-c), wherein $X^1$ is fluorine, and $X^2$ chlorine. In this case, the minimum temperature of a nematic phase of the liquid crystal composition may be decreased in some cases.

Among the compositions, a liquid crystal composition using a mixture of a compound represented by Formulas (2-a) to (2-c), wherein $X^1$ is chlorine, and $X^2$ fluorine, and a compound represented by Formulas (2-a) to (2-c), wherein $X^1$ is fluorine, and $X^2$ chlorine, as the second component, may have a low minimum temperature of a nematic phase in some cases.

Third Component

The liquid crystal composition of the invention includes a third component, which is at least one liquid crystal compound selected from the group of compounds represented by Formula (3).

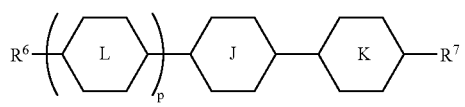

(3)

In Formula (3), $R^6$ is independently alkyl or alkenyl, and $R^7$ is independently, alkyl, alkenyl, or alkoxy. Preferred embodiments of $R^6$ are the same as $R^2$ of the compound represented by Formula (1) as the first component. Preferred embodiments of $R^7$ are the same as $R^1$ of the compound represented by Formula (1) as the first component.

Ring L is independently 1,4-cyclohexylene or 1,4-phenylene. Ring J and ring K are each independently 1,4-cyclohexylene, 1,4-phenylene, 2-fluoro-1,4-phenylene, or 3-fluoro-1,4-phenylene and p is 0 or 1.

The liquid crystal composition of the invention has a small viscosity owing to the structure of the liquid crystal compound as the third component. The maximum temperature of a nematic phase and the optical anisotropy of the liquid crystal composition can be easily controlled by changing the content ratio of the third component with respect to the total weight of the liquid crystal compounds.

Among the liquid crystal compounds represented by Formula (3), compounds represented by Formulas (3-1) to (3-6) are preferred.

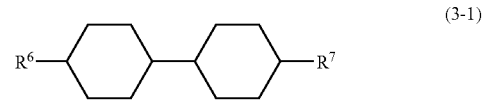

(3-1)

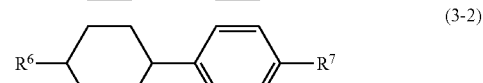

(3-2)

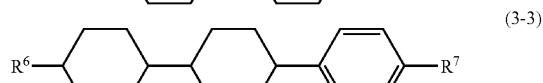

(3-3)

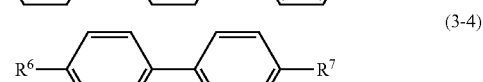

(3-4)

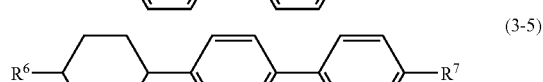

(3-5)

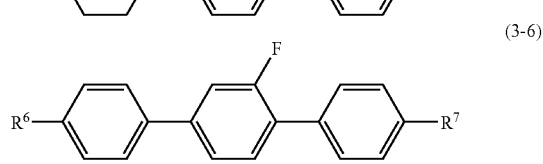

(3-6)

$R^6$ and $R^7$ are the same as in the compound represented by Formula (3).

Among these compounds, the compounds represented by Formulas (3-1) to (3-3) are more preferred since the liquid crystal composition can have a low minimum temperature of a nematic phase, a small optical anisotropy, and a small viscosity.

The liquid crystal compounds may be used as the third component solely or in combination of plural kinds thereof.

Fourth Component

The liquid crystal composition of the invention may optionally contain a fourth component, which is at least one liquid crystal compound selected from the group of compounds represented by Formulas (4-1) to (4-3).

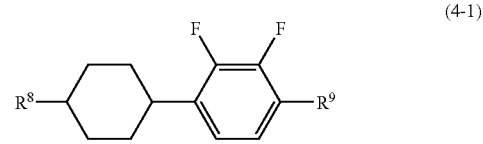

(4-1)

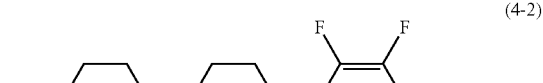

(4-2)

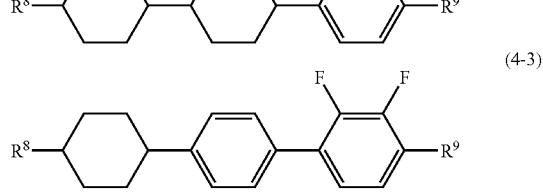

(4-3)

In Formulas (4-1) to (4-3), $R^8$ and $R^9$ are each independently defined as follows.

$R^8$ is independently alkyl or alkenyl. $R^9$ is independently, alkyl, alkenyl, or alkoxy. Preferred embodiments of $R^8$ are the same as alkyl or alkenyl of $R^2$ of the compound represented by Formula (1) as the first component. Preferred embodiments of $R^9$ are the same as alkyl, alkenyl, or alkoxy of $R^1$ of the compound represented by Formula (1) as the first component.

The compounds represented by Formulas (4-1) to (4-3) have 2,3-difluoro-1,4-phenylene. The liquid crystal composition of the invention has a large negative dielectric anisotropy owing to the structure of the liquid crystal compound as the fourth component. In particular, in the case where $R^9$ in Formula (4-1) to (4-3) is alkoxy, the dielectric anisotropy can be further negatively increased.

Among the liquid crystal compounds represented by Formulas (4-1) to (4-3), compounds represented by Formulas (4-1) and (4-2) are preferred for decreasing the optical anisotropy.

In the case where the fourth component is the aforementioned compounds, the dielectric anisotropy of the liquid crystal composition can be negatively increased.

The liquid crystal compounds may be used as the fourth component solely or in combination of plural kinds thereof.

Synthesis Method of Liquid Crystal Compounds

Examples of the preparation methods of the liquid crystal compounds used in the liquid crystal composition of the invention will be explained.

The compound represented by Formula (1), which is represented by compounds represented by Formulas (1-1) to (1-8) and (1-13), can be synthesized by the methods disclosed in JP 2005-35986 A and International Publication No. 2005/000995.

The compound represented by Formula (2), which is represented by compounds represented by Formulas (2-3) to (2-6), can be synthesized by the methods disclosed in International Application No. WO 98/23561.

The compound represented by Formula (3), which is represented by compounds represented by Formulas (3-1) and so forth, can be synthesized by the methods disclosed in JP S59-70624 A/1984 and JP S60-16940 A/1985.

The compounds for which preparation methods were not described above can be prepared according to the methods described in ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), NEW EXPERIMENTAL CHEMISTRY COURSE (Shin Jikken Kagaku Kouza) (Maruzen, Inc.), and so forth.

Liquid Crystal Composition (1)

Combinations of the components of the composition and preferred content ratios of the components will be described.

The liquid crystal composition of the invention contains a combination of the first component, the second component and the third component (which is hereinafter referred to as a liquid crystal composition (1) in some cases).

The composition containing the combination of three components has a large negative dielectric anisotropy.

In the case where the liquid crystal composition contains at least one compound selected from the group of compounds represented by Formulas (1-1) to (1-4) as the first component, at least one compound selected from the group of compounds represented by Formulas (2-1) to (2-6) as the second component, and at least one compound selected from the group of compounds represented by Formulas (3-1) to (3-3) as the third component, the liquid crystal compound composition can have a low minimum temperature of a nematic phase, a negatively large dielectric anisotropy, and a further small optical anisotropy.

The content ratios of the first component, the second component and the third component in the liquid crystal composition (1) of the invention are not particularly limited. It is preferred that the content ratio of the first component is from approximately 2% to approximately 40% by weight, the second component is from approximately 10% to approximately 80% by weight, and the content ratio of the third component is from approximately 5% to approximately 60% by weight. It is more preferred that the content ratio of the first component is from approximately 5% to approximately 40% by weight, the second component is from approximately 30% to approximately 70% by weight, and the content ratio of the third component is from approximately 10% to approximately 40% by weight, based on the total weight of the liquid crystal compounds in the liquid crystal composition.

In the case where the second component is a compound represented by Formulas (2-9) and (2-10), wherein $R^5$ represents alkyl or alkenyl, the compounds represented by these formulas are redundant. Accordingly, the compound represented by Formulas (2-9) and (2-10), wherein $R^5$ represents alkyl or alkenyl is expressed as a compound represented by formula (2-9) upon calculating the content ratio of the second component.

In the case where the content ratios of the first component, the second component and the third component are in the aforementioned ranges, the liquid crystal composition can have an enhanced temperature range of a nematic phase, a small optical anisotropy in a suitable range, a dielectric anisotropy in a suitable range and a large specific resistance.

Liquid Crystal Composition (2)

The liquid crystal composition of the invention preferably contains the fourth component in addition to the first, second and third components (which is hereinafter referred to as a liquid crystal composition (2) in some cases). Owing to the combination of the components, the liquid crystal composition can have an enhanced temperature range of a nematic phase, an optical anisotropy in a suitable range, a dielectric anisotropy in a suitable range and a large specific resistance.

In the case where the liquid crystal composition contains at least one compound selected from the group of compounds represented by Formulas (1-1) to (1-4) as the first component, at least one compound selected from the group of compounds represented by Formulas (2-1) to (2-4) as the second component, at least one compound selected from the group of compounds represented by Formulas (3-1) to (3-3) as the third component, and at least one compound selected from the group of compounds represented by Formulas (4-1) and (4-2) as the fourth component, the liquid crystal compound composition can have a low minimum temperature of a nematic phase, a large negative dielectric anisotropy, and a small optical anisotropy.

The content ratios of the first component, the second component, the third component and the fourth component in the liquid crystal composition (2) of the invention are not particularly limited. It is preferred that the content ratio of the first component is from approximately 2% to approximately 40% by weight, the content ratio of the second component is from approximately 10% to approximately 70% by weight, the content ratio of the third component is from approximately 5% to approximately 60% by weight, and the content ratio of the fourth component is from approximately 5% to approximately 70% by weight. It is more preferred that the content ratio of the first component is from approximately 5% to approximately 40% by weight, the content ratio of the second component is from approximately 3% to approximately 70% by weight, the content ratio of the third component is from approximately 10% to approximately 40% by weight, and the content ratio of the fourth component is from approximately 5% to approximately 40% by weight, based on the total weight of the liquid crystal compounds in the liquid crystal composition.

In the case where the content ratios of the first component, the second component, the third component and the fourth component of the liquid crystal composition (2) are in the aforementioned ranges, the liquid crystal composition can have an enhanced temperature range of a nematic phase, an optical anisotropy in a suitable range, a dielectric anisotropy in a suitable range and a large specific resistance.

Embodiments of Liquid Crystal Composition

The liquid crystal composition of the invention may contain, in addition to the first, second and third components and the fourth component added depending on necessity, another liquid crystal compound in some cases for controlling the characteristics of the liquid crystal composition. The liquid crystal composition of the invention can optionally include no liquid crystal compounds other than the first, second and third components and the fourth component added depending on necessity from the standpoint, for example, of cost.

The liquid crystal composition of the invention may further contain at least one additive, such as an optically active compound, a coloring matter, a defoaming agent, an ultraviolet ray absorbent and an antioxidant.

In the case where an optically active compound is added to the liquid crystal composition of the invention, a helical structure can be induced in the liquid crystal to apply a twist angle thereto.

In the case where a coloring matter is added to the liquid crystal composition of the invention, the composition can be applied to a liquid crystal display device having a guest host (GH) mode.

In the case where a defoaming agent is added to the liquid crystal composition of the invention, the composition can be prevented from being foamed during transportation of the liquid crystal composition or during the production process of a liquid crystal display device with the liquid crystal composition.

In the case where an ultraviolet ray absorbent or an antioxidant is added to the liquid crystal composition of the invention, the liquid crystal composition or a liquid crystal display device including the liquid crystal composition can be prevented from being deteriorated. For example, an antioxidant can suppress the specific resistance from being decreased upon heating the liquid crystal composition.

Examples of the ultraviolet ray absorbent include a benzophenone ultraviolet ray absorbent, a benzoate ultraviolet ray absorbent and a triazole ultraviolet ray absorbent.

Specific examples of the benzophenone ultraviolet ray absorbent include 2-hydroxy-4-octoxybenzophenone.

Specific examples of the benzoate ultraviolet ray absorbent include 2,4-di-tert-butylphenyl-3,5-di-tert-butyl-4-hydroxybenzoate.

Specific examples of the triazole ultraviolet ray absorbent include 2-(2-hydroxy-5-methylphenyl)benzotriazole, 2-(2-hydroxy-3-(3,4,5,6-tetrahydroxyphthalimide-methyl)-5-methylphenyl) benzotriazole and 2-(3-tert-butyl-2-hydroxy-5-methylphenyl)-5-chlorobenzotriazole.

Examples of the antioxidant include a phenol antioxidant and an organic sulfur antioxidant.

Specific examples of the phenol antioxidant include 3,5-di-tert-butyl-4-hydroxytoluene, 2,6-di-tert-butyl-4-pentylphenol, 2,6-di-tert-butyl-4-heptylphenol, 2,2'-methylenebis(6-tert-butyl-4-methylphenol), 4,4'-butylidenebis(6-tert-butyl-3-methylphenol), 2,6-di-tert-butyl-4-(2-octadecyloxycarbonyl)ethylphenol and pentaerythritol tetrakis(3-(3,5-di-tert-butyl-4-hydroxyphenyl)propionate).

Specific examples of the organic sulfur antioxidant include dilauryl-3,3'-thiopropionate, dimyristyl-3,3'-thiopropyonate, distearyl-3,3'-thiopropionate, pentaerythritol tetrakis(3-laurylthiopropionate) and 2-mercaptobenzimidazole.

The additives represented by an ultraviolet ray absorbent and an antioxidant can be used in such an amount range that the objects of the addition of the additives are attained, but the objects of the invention are not impaired. For example, in the case where an ultraviolet ray absorbent is added, the addition amount thereof is generally from approximately 100 to approximately 1,000,000 ppm, preferably from approximately 100 to approximately 10,000 ppm, and more preferably from approximately 1,000 to approximately 10,000 ppm, based on the total weight of the liquid crystal compounds. For example, in the case where an antioxidant is added, the addition amount thereof is generally from approximately 10 to approximately 500 ppm, preferably from approximately 30 to approximately 300 ppm, and more preferably from approximately 40 to approximately 200 ppm, based on the total weight of the liquid crystal compounds.

The liquid crystal composition of the invention may contain, in some cases, impurities, such as a synthesis raw material, a by-product, a reaction solvent and a synthesis catalyst, that are mixed therein during the synthesis process of the compounds constituting the liquid crystal composition and the preparation process of the liquid crystal composition.

Production Method of Liquid Crystal Composition

The liquid crystal composition of the invention can be prepared, for example, by mixing or by shaking the component compounds when the compounds are in a liquid state, or by mixing the compounds, which are then melted by heating, followed by shaking when the compounds contains one in a solid state. The liquid crystal composition of the invention can also be prepared by the other known methods.

Characteristics of the Liquid Crystal Composition

The liquid crystal composition of the invention generally has an optical anisotropy of from approximately 0.05 to approximately 0.12. The liquid crystal composition of the invention can have an optical anisotropy in a range of from approximately 0.06 to approximately 0.10 by appropriately controlling the composition and so forth.

The liquid crystal composition of the invention generally has a dielectric anisotropy of from approximately −6.5 to approximately −2.0, and preferably a liquid crystal composition having a dielectric anisotropy of from approximately −5.0 to approximately −3.0 can be obtained. A liquid crystal composition having a dielectric anisotropy in the aforementioned ranges can be preferably applied to liquid crystal display devices having an IPS mode and a VA mode.

In the liquid crystal composition of the invention, such a liquid crystal composition can be generally obtained that has both an optical anisotropy in the aforementioned ranges and a dielectric anisotropy in the aforementioned ranges.

In order to maximize a contrast ratio of a liquid crystal display device driven in an IPS mode or a VA mode, it is designed in such a manner that the product ($\Delta n \cdot d$) of the optical anisotropy ($\Delta n$) of the liquid crystal composition and the cell gap (d) of the liquid crystal display device is a constant value. In a VA mode, the value ($\Delta n \cdot d$) is preferably in a range of from approximately 0.30 to approximately 0.35 µm, and in an IPS mode, the value ($\Delta n \cdot d$) is preferably in a range of from approximately 0.20 to approximately 0.30 µm. The cell gap (d) is generally from approximately 3 to approximately 6 µm, and therefore, the optical anisotropy of the liquid crystal composition is preferably in a range of from approximately 0.05 to approximately 0.11 in order to maximize the contrast ratio.

In the case where the cell gap (d) is 4 μm or more in a VA mode, it is not preferred in some cases since the response speed of the liquid crystal display device is decreased. A large response speed is necessary for displaying a moving image, and a liquid crystal display device having a cell gap (d) of less than 4 μm is used therefor. A liquid crystal composition used in the device has a larger optical anisotropy than the ordinary range and is, for example, in a range of from approximately 0.10 to approximately 0.15, and is also applicable to an IPS mode.

Liquid Crystal Display Device

The liquid crystal composition of the invention can be applied to a liquid crystal display device. The liquid crystal display device of the invention may be driven in an AM mode or a passive matrix (PM) mode, and may be displayed in any display mode, such as a PC mode, a TN mode, an STN mode, an OCB mode, a VA mode and an IPS mode. The liquid crystal display device driven in an AM mode or a PM mode can be applied to a liquid crystal display of any type, i.e., a reflection type, a transmission type or a semi-transmission type.

The liquid crystal composition of the invention can be applied to a dynamic scattering (DS) mode device using a liquid crystal composition including an electroconductive agent, a nematic curvilinear aligned phase (NCAP) device prepared by microcapsulating a liquid crystal composition, and a polymer dispersed (PD) device in which a three dimensional net-work polymer is formed in a liquid crystal composition, for example, a polymer network (PN) device.

Owing to the aforementioned characteristics of the liquid crystal composition of the invention, the liquid crystal composition can be preferably applied to an AM mode liquid crystal display device driven in an operation mode utilizing negative dielectric anisotropy, such as a VA mode and an IPS mode, and particularly preferably applied to an AM mode liquid crystal display device driven in a VA mode.

In a liquid crystal display device driven in a TN mode, a VA mode or the like, the direction of the electric field is perpendicular to the liquid crystal layer. In a liquid crystal display device driven in an IPS mode or the like, the direction of the electric field is in parallel to the liquid crystal layer. The structure of the liquid crystal display device driven in a VA mode has been reported in K. Ohmuro, S. Kataoka, T. Sasaki and Y Koike, *SID '97 Digest of Technical Papers*, vol. 28, p. 845 (1997), and the structure of the liquid crystal display device driven in an IPS mode has been reported in International Publication 91/10936 (U.S. Pat. No. 5,576,867).

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted, to limit the scope of the invention.

EXAMPLES

The invention will be explained in detail by way of examples. The invention is not limited to the examples. The liquid crystal compounds used in the Examples are expressed by the symbols according to the definition in Table 1 below. The steric configuration of 1,4-cyclohexylene in Table 1 is a trans configuration. The ratio (percentage) of the liquid crystal compound is percentage by weight (% by weight) based on the total weight of liquid crystal compounds unless otherwise indicated. In the following Examples, respective components were weighed accurately and blended. The characteristics of the composition are summarized in the last of the Examples.

The numerals attached to the liquid crystal compounds used in the Examples correspond to the formula numbers representing the liquid crystal compounds used as the first, second, third and fourth components of the invention, and the case where no formula number is indicated but a symbol "-" is indicated means another liquid crystal compound that does not correspond to the components of the invention.

The method of description of compounds using symbols is shown below.

TABLE 3

Method of Description of Compound using Symbols
R—(A$_1$)—Z$_1$—...—Z$_n$—(A$_n$)—X

| | Symbol |
|---|---|
| 1) Left Terminal Group R— | |
| C$_n$H$_{2n+1}$— | n- |
| C$_n$H$_{2n+1}$O— | nO— |
| C$_n$H$_{2n+1}$OC$_m$H$_{2m}$— | nOm- |
| CH$_2$=CH— | V— |
| CH$_2$=CHC$_n$H$_{2n}$— | Vn- |
| 2) Right Terminal Group —X | |
| —C$_n$H$_{2n+1}$ | -n |
| —OC$_n$H$_{2n+1}$ | —On |
| —CH=CH$_2$ | —V |
| —C$_n$H$_{2n}$CH=CH$_2$ | -nV |
| —CH=CH$_2$C$_n$H$_{2n}$ | —Vn |
| 3) Bonding group —Z$_n$— | |
| —C$_n$H$_{2n}$— | n |
| —CH$_2$O— | 1O |
| —OCH$_2$— | O1 |
| —CH=CH— | V |
| 4) Ring Structure —A$_n$— | |
| 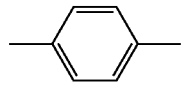 | B |
| 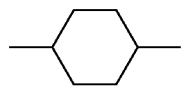 | H |
| 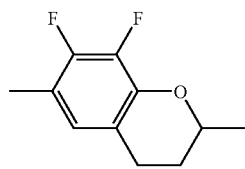 | Cro(7F, 8F) |
| 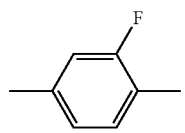 | B(3F) |
| 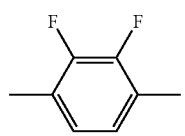 | B(2F, 3F) |

TABLE 3-continued

Method of Description of Compound using Symbols
R—(A₁)—Z₁—...—Zₙ—(Aₙ)—X

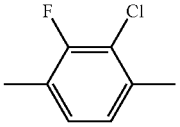 B(2F, 3Cl)

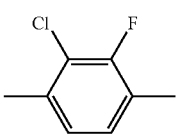 B(2Cl, 3F)

5) Example of Description

Example 1 3-BB(3F)B-5

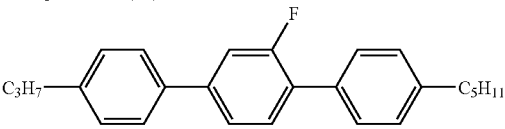

Example 2 3-H1OCro(7F, 8F)-5

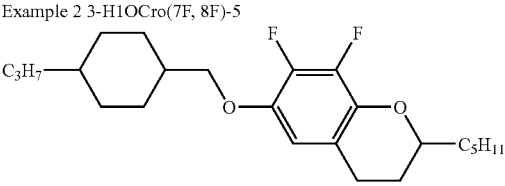

Example 3 5-HHB(2F, 3Cl)—O2

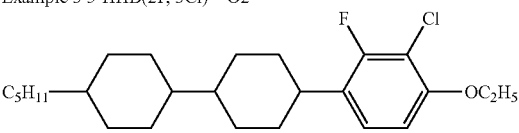

Measurements of the characteristics were carried out according to the following methods. Most methods are described in the Standard of Electric Industries Association of Japan, EIAJ ED-2521 A or those with some modifications.

(1) Maximum Temperature of a Nematic Phase (NI; ° C.): A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit of a temperature range of a nematic phase may be abbreviated to "a maximum temperature."

(2) Minimum Temperature of a Nematic Phase (Tc; ° C.): A sample having a nematic phase was kept in a freezer at temperatures of 0° C., −10° C., −20° C., −30° C. and −40° C. for ten days, respectively, and the liquid crystal phase was observed. For example, when the sample remained in a nematic phase at −20° C. and changed to crystals or a smectic phase at −30° C., Tc was expressed as ≦−20° C. A lower limit of a temperature range of a nematic phase may be abbreviated to "a minimum temperature."

(3) Optical Anisotropy (Δn; measured at 25° C.): Measurement was carried out with an Abbe refractometer mounting a polarizing plate on an ocular using a light at a wavelength of 589 nm. The surface of a main prism was rubbed in one direction, and then a sample was dropped on the main prism. The refractive index n∥ was measured when the direction of the polarized light was parallel to that of the rubbing, and the refractive index n⊥. was measured when the direction of the polarized light was perpendicular to that of the rubbing. A value (Δn) of optical anisotropy was calculated from the equation: Δn=n∥−n⊥.

(4) Viscosity (η; mPa·s, measured at 20° C.): The measurement was carried out by using an E-type viscometer.

(5) Dielectric Anisotropy (Δ∈; measured at 25° C.): A solution of octadecyltriethoxysilane (0.16 mL) dissolved in ethanol (20 mL) was coated on a glass substrate having been well cleaned. The glass substrate was rotated with a spinner and then heated to 150° C. for 1 hour. A VA device having a distance (cell gap) of 20 μm was fabricated with two sheets of the glass substrates.

A polyimide orientation film was prepared on a glass substrate in the same manner. The orientation film on the obtained glass substrate was subjected to a rubbing treatment, and a TN element having a distance between two sheets of the glass substrates of 9 μm and a twisted angle of 80° was fabricated.

A specimen was charged in the obtained VA device, to which a voltage of 0.5 V (1 kHz, sine wave) was applied, and a dielectric constant (∈∥) in the major axis direction of the liquid crystal molecule was measured.

A specimen was charged in the TN device, to which a voltage of 0.5 V (1 kHz, sine wave) was applied, and a dielectric constant (∈⊥) in the minor axis direction of the liquid crystal molecule was measured.

The dielectric anisotropy Δ∈ was calculated by the equation: Δ∈=∈∥−∈⊥.

A composition having the negative value is a composition having a negative dielectric anisotropy.

(6) Voltage Holding Ratio (VHR; measured at 25° C.; %): A specimen was charged in a TN device having a polyimide orientation film and having a distance between two glass substrate (cell gap) of 6 μm. A pulse voltage (60 μs at 5 V) was applied to the TN device at 25° C. to charge the device. The waveform of the voltage applied to the TN device was observed with a cathode ray oscilloscope, and an area surrounded by the voltage curve and the abscissa per unit cycle (16.7 ms) was obtained. The area was obtained in the same manner from a voltage waveform applied after removing the TN device. The value of the voltage holding ratio (%) was calculated by the equation:(voltage holding ratio)=(area with TN device)/(area without TN device)×100.

The voltage holding ratio thus obtained was designated as VHR-1. A liquid crystal composition contained in a liquid crystal display device having a large voltage holding ratio has a large specific resistance. Subsequently, the TN device was heated to 100° C. for 250 hours. After cooling the TN device to 25° C., the voltage holding ratio was measured in the same manner. The voltage holding ratio obtained after the heating test was designated as VHR-2. The heating test is an accelerating test and is a test corresponding to a long term durability test of the TN device.

(7) Gas Chromatography Analysis: Gas Chromatograph Model GC-14B made by Shimadzu Corp. or an equivalent thereof was used as a measuring apparatus. Capillary Column CBP1-M25-025 (length: 25 m, bore: 0.22 mm, film thickness: 0.25 μm, dimethylpolysiloxane as stationary liquid phase, no polarity) made by Shimadzu Corp. was used as a column. Helium was used as a carrier gas, and the flow rate was controlled to 2 mL/minute. The column was maintained at 200° C. for 2 minutes and then heated to 280° C. at a rate of 5° C. per minute. A specimen evaporating chamber and a detector (FID) were set up at 280° C. and 300° C., respectively.

A specimen was dissolved in acetone to prepare a solution of 0.1% by weight, and 1 μL of the resulting solution was injected into the specimen evaporating chamber.

The recorder used was Chromatopac Model C-R5A made by Shimadzu Corp. or an equivalent thereof. Gas chromatogram obtained showed a retention time of a peak and a peak area corresponding to the component compound.

The solvent for diluting the specimen may also be, for example, chloroform or hexane. The following capillary columns may also be used: DB-1 made by Agilent Technologies Inc. (length: 30 m, bore: 0.32 mm, film thickness: 0.25 μm), HP-1 made by Agilent Technologies Inc. (length: 30 m, bore: 0.32 mm, film thickness: 0.25 μm), Rtx-1 made by Restek Corp. (length: 30 m, bore: 0.32 mm, film thickness: 0.25 μm), and BP-1 made by SGE International Pty. Ltd. (length: 30 m, bore: 0.32 mm, film thickness: 0.25 μm). In order to prevent compound peaks from overlapping, a capillary column CBP1-M50-025 (length: 50 m, bore: 0.25 mm, film thickness: 0.25 μm) made by Shimadzu Corp. may be used.

An area ratio of each peak in the gas chromatogram corresponds to the ratio of the component compounds. In general, the percentage by weight of the component compound of the specimen is not completely identical to the area ratio of each peak of the specimen. According to the invention, however, the percentage by weight of the component compound of the specimen may be regarded to be identical to the percentage by area of each peak of the specimen since the correction coefficient is substantially 1 when these capillary columns are used because there is no significant difference in correction coefficient among the liquid crystal compounds as the component compounds. In order to more precisely obtain the compositional ratio of the liquid crystal compounds in the liquid crystal composition by gas chromatogram, an internal reference method is applied to gas chromatogram. The liquid crystal compound components (components to be measured) having been precisely weighed and a standard liquid crystal compound (standard substance) are simultaneously measured by gas chromatography, and the relative intensity of the area ratio of peaks of the components to be measured and a peak of the standard substance is calculated in advance. The compositional ratio of the liquid crystal compounds in the liquid crystal composition can be precisely obtained by gas chromatography analysis by correcting using the relative intensity of the peak areas of the components with respect to the standard substance.

Comparative Example 1

The following composition was prepared, and the characteristic values thereof were measured by the aforementioned methods. The composition in this example contains the second component and the third component of the invention.

| 3-HB(2F,3Cl)-O2 | (2-1) | 15% |
| 5-HB(2F,3Cl)-O2 | (2-1) | 14% |
| 3-HHB(2F,3Cl)-O2 | (2-3) | 8% |
| 5-HHB(2F,3Cl)-O2 | (2-3) | 8% |
| 3-HH2B(2F,3Cl)-O2 | (2) | 9% |
| 5-HH2B(2F,3Cl)-O2 | (2) | 8% |
| 3-HH-V | (3-1) | 16% |
| 5-HH-V | (3-1) | 22% |

NI = 70.1° C.;
$T_C \leq -20$° C.;
Δn = 0.069;
Δε = −2.6;
η = 20.8 mPa·s;
VHR-1 = 99.3%.

Reference Data 1

The composition disclosed in Example 1 of JP 2005-281560 A is shown below. The characteristic values thereof are those disclosed in JP 2005-281560 A. The composition in this example contains the first component and the third component of the invention.

| 3-H1OCro(7F,8F)-5 | (1-2) | 6% |
| 5-H1OCro(7F,8F)-4 | (1-2) | 8% |
| 2-HH1OCro(7F,8F)-4 | (1-6) | 10% |
| 2-HH1OCro(7F,8F)-5 | (1-6) | 10% |
| 3-HH1OCro(7F,8F)-5 | (1-6) | 5% |
| 4-HH1OCro(7F,8F)-4 | (1-6) | 10% |
| 5-HH-V | (3-1) | 20% |
| 3-HH-2V | (3-1) | 15% |
| V2-HHB-1 | (3-3) | 5% |
| 3-HVH-3 | — | 11% |

NI = 84° C.;
Δn = 0.068;
Δε = −3.2.

Example 1

The following composition was prepared, and the characteristic values thereof were by the aforementioned methods.

| 5-H1OCro(7F,8F)-5 | (1-2) | 14% |
| 3-HB(2F,3Cl)-O2 | (2-1) | 15% |
| 3-HHB(2F,3Cl)-O2 | (2-3) | 9% |
| 5-HHB(2F,3Cl)-O2 | (2-3) | 8% |
| 3-HHB(2Cl,3F)-O2 | (2-4) | 8% |
| 5-HHB(2Cl,3F)-O2 | (2-4) | 8% |
| 3-HH-V | (3-1) | 16% |
| 5-HH-V | (3-1) | 22% |

NI = 71.7° C.;
$T_C \leq -10$° C.;
Δn = 0.067;
Δε = −3.1;
VHR-1 = 99.2%.

Example 2

The following composition was prepared, and the characteristic values thereof were by the aforementioned methods.

| 3-H2Cro(7F,8F)-5 | (1-1) | 5% |
| 3-H1OCro(7F,8F)-5 | (1-2) | 5% |
| 5-H1OCro(7F,8F)-5 | (1-2) | 5% |
| 2-Cro(7F,8F)H-3 | (1-3) | 5% |
| 3-HH2Cro(7F,8F)-5 | (1-5) | 5% |
| 3-HH1OCro(7F,8F)-5 | (1-6) | 5% |
| 2-Cro(7F,8F)HH-3 | (1-7) | 5% |
| 2-Cro(7F,8F)2HH-3 | (1-8) | 5% |
| 3-HB(2F,3Cl)-O2 | (2-1) | 10% |
| 3-HHB(2F,3Cl)-O2 | (2-3) | 10% |
| 5-HHB(2F,3Cl)-O2 | (2-3) | 10% |
| 3-HHB(2Cl,3F)-O2 | (2-4) | 9% |
| 5-HHB(2Cl,3F)-O2 | (2-4) | 9% |
| 3-HH-4 | (3-1) | 12% |

NI = 94.4° C.;
Δn = 0.082;
Δε = −4.9.

Example 3

The following composition was prepared, and the characteristic values thereof were by the aforementioned methods.

| | | |
|---|---|---|
| 3-H2Cro(7F,8F)-5 | (1-1) | 4% |
| 2-Cro(7F,8F)2H-3 | (1-4) | 4% |
| 3-HB(2F,3Cl)-O2 | (2-1) | 15% |
| 5-HB(2F,3Cl)-O2 | (2-1) | 15% |
| 3-HHB(2F,3Cl)-O2 | (2-3) | 9% |
| 5-HHB(2F,3Cl)-O2 | (2-3) | 9% |
| 3-HBB(2F,3Cl)-O2 | (2-5) | 9% |
| 5-HBB(2F,3Cl)-O2 | (2-5) | 9% |
| 2-HH-5 | (3-1) | 11% |
| 3-HH-4 | (3-1) | 12% |
| 3-HB-O2 | (3-2) | 3% |

NI = 69.5° C.;
$T_C \leq -20°$ C.;
$\Delta n = 0.084$;
$\Delta \epsilon = -3.5$.

Example 4

The following composition was prepared, and the characteristic values thereof were measured by the aforementioned methods.

| | | |
|---|---|---|
| 3-H2Cro(7F,8F)-5 | (1-1) | 6% |
| 3-HH2Cro(7F,8F)-5 | (1-5) | 4% |
| 3-HB(2F,3Cl)-O2 | (2-1) | 10% |
| 5-HB(2F,3Cl)-O2 | (2-1) | 10% |
| 3-HHB(2F,3Cl)-O2 | (2-3) | 8% |
| 5-HHB(2F,3Cl)-O2 | (2-3) | 8% |
| 2-HH-5 | (3-1) | 11% |
| 3-HH-4 | (3-1) | 11% |
| 3-HB-O2 | (3-2) | 10% |
| 3-HB(2F,3F)-O2 | (4-1) | 8% |
| 3-HHB(2F,3F)-O2 | (4-2) | 7% |
| 5-HHB(2F,3F)-O2 | (4-2) | 7% |

NI = 70.0° C.;
$T_C \leq -10°$ C.;
$\Delta n = 0.072$;
$\Delta \epsilon = -3.1$;
VHR-1 = 99.2%.

Example 5

The following composition was prepared, and the characteristic values thereof were d by the aforementioned methods.

| | | |
|---|---|---|
| 3-H2Cro(7F,8F)-5 | (1-1) | 5% |
| 2O-Cro(7F,8F)2H-3 | (1-4) | 3% |
| 3-HB(2F,3Cl)-O2 | (2-1) | 10% |
| 5-HB(2F,3Cl)-O2 | (2-1) | 10% |
| 3-HB(2Cl,3F)-O2 | (2-2) | 10% |
| 3-HHB(2F,3Cl)-O2 | (2-3) | 9% |
| 3-HHB(2Cl,3F)-O2 | (2-4) | 9% |
| 3-HBB(2F,3Cl)-O2 | (2-5) | 9% |
| 5-HBB(2F,3Cl)-O2 | (2-5) | 9% |
| 2-HH-5 | (3-1) | 5% |
| 3-HH-4 | (3-1) | 12% |
| 3-HHB-1 | (3-3) | 3% |
| 3-HBB(2F,3F)-O2 | (4-3) | 6% |

NI = 78.4° C.;
$T_C \leq -20°$ C.;
$\Delta n = 0.091$;
$\Delta \epsilon = -3.8$.

Example 6

The following composition was prepared, and the characteristic values thereof were measured by the aforementioned methods.

| | | |
|---|---|---|
| 3-H2Cro(7F,8F)-5 | (1-1) | 4% |
| 5-H1OCro(7F,8F)-5 | (1-2) | 5% |
| 2-Cro(7F,8F)H-3 | (1-3) | 3% |
| 2-Cro(7F,8F)2H-3 | (1-4) | 4% |
| 3-HB(2F,3Cl)-O2 | (2-1) | 10% |
| 3-BB(2F,3Cl)-O2 | (2-7) | 6% |
| 3-BB(2Cl,3F)-O2 | (2-8) | 6% |
| 3-HHB(2F,3Cl)-O2 | (2-3) | 9% |
| 3-HHB(2Cl,3F)-O2 | (2-4) | 9% |
| 3-HBB(2F,3Cl)-O2 | (2-5) | 9% |
| 3-HBB(2Cl,3F)-O2 | (2-6) | 9% |
| 3-BB(2F,3Cl)B-2 | (2-9) | 3% |
| 3-BB(2Cl,3F)B-O2 | (2-10) | 3% |
| 5-HH-V | (3-1) | 12% |
| 2-BB(3F)B-3 | (3-6) | 8% |

NI = 71.9° C.;
$T_C \leq -20°$ C.;
$\Delta n = 0.115$;
$\Delta \epsilon = -3.7$.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A liquid crystal composition having a negative dielectric anisotropy and comprising three components, wherein the first component is at least one compound selected from the group of compounds represented by formula (1), the second component is at least one compound selected from the group consisting of compounds represented by formulas (2-a), (2-b) and (2-c), and the third component is at least one compound selected from the group consisting of compounds represented by formula (3):

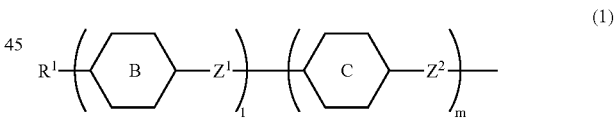

(1)

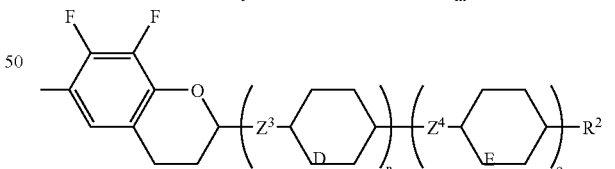

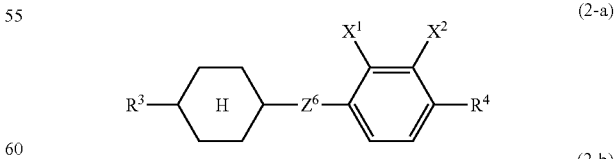

(2-a)

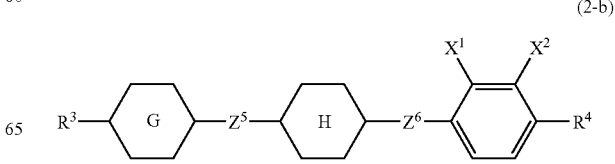

(2-b)

-continued (2-c)

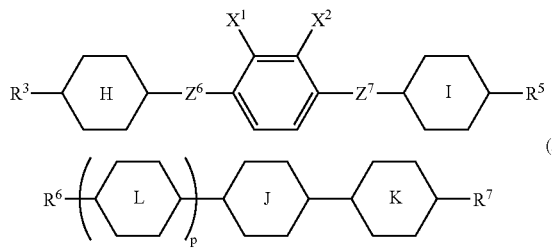

(3)

wherein:
R², R³ and R⁶ are each independently alkyl or alkenyl;
R¹, R⁴, R⁵ and R⁷ are each independently alkyl, alkenyl, or alkoxy;
Ring B, ring C, ring D, ring E, ring G, ring H, ring I and ring L are each independently 1,4-cyclohexylene or 1,4-phenylene;
Ring J and ring K are each independently 1,4-cyclohexylene, 1,4-phenylene, 2-fluoro-1,4-phenylene, or 3-fluoro-1,4-phenylene;
$Z^1, Z^2, Z^3, Z^4, Z^5, Z^6$ and $Z^7$ are each independently a single bond, —(CH₂)₂—, —CH₂O—, or —OCH₂—;
one of X¹ and X² is independently fluorine, and the other thereof is independently chlorine; and
l, m, n, o and p are each independently 0 or 1, provided that l+m+n+o is 1 or 2.

2. The liquid crystal composition according to claim 1, wherein the first component is at least one compound selected from the group of compounds represented by formulas (1-1) to (1-11):

-continued (1-5)

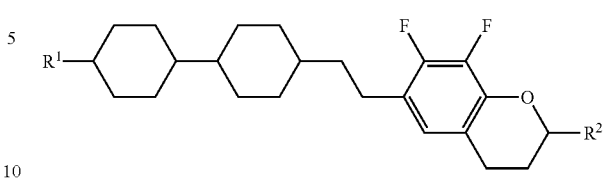

(1-6)

(1-7)

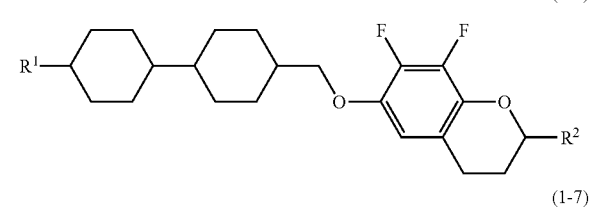

(1-8)

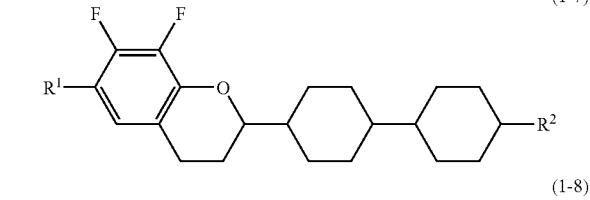

(1-9)

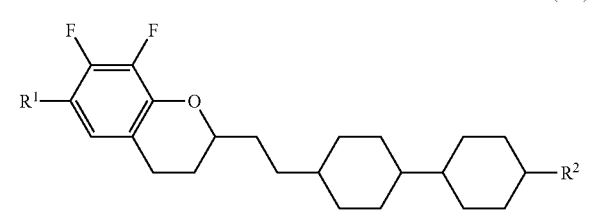

(1-10)

(1-11)

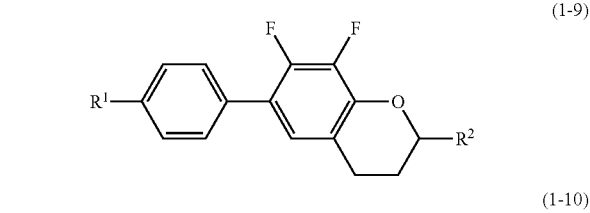

(1-1)

(1-2)

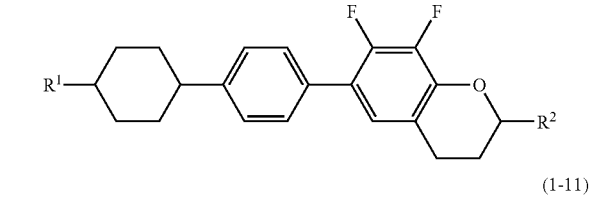

(1-3)

(1-4)

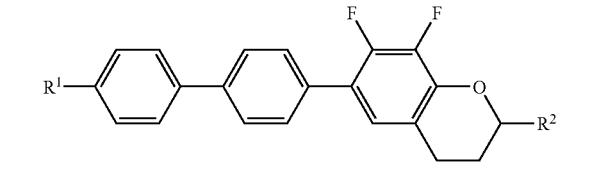

wherein
R² is independently alkyl or alkenyl; and
R¹ is independently alkyl, alkenyl, or alkoxy.

3. The liquid crystal composition according to claim 1, wherein the second component is at least one compound selected from the group of compounds represented by formulas (2-1) to (2-10):

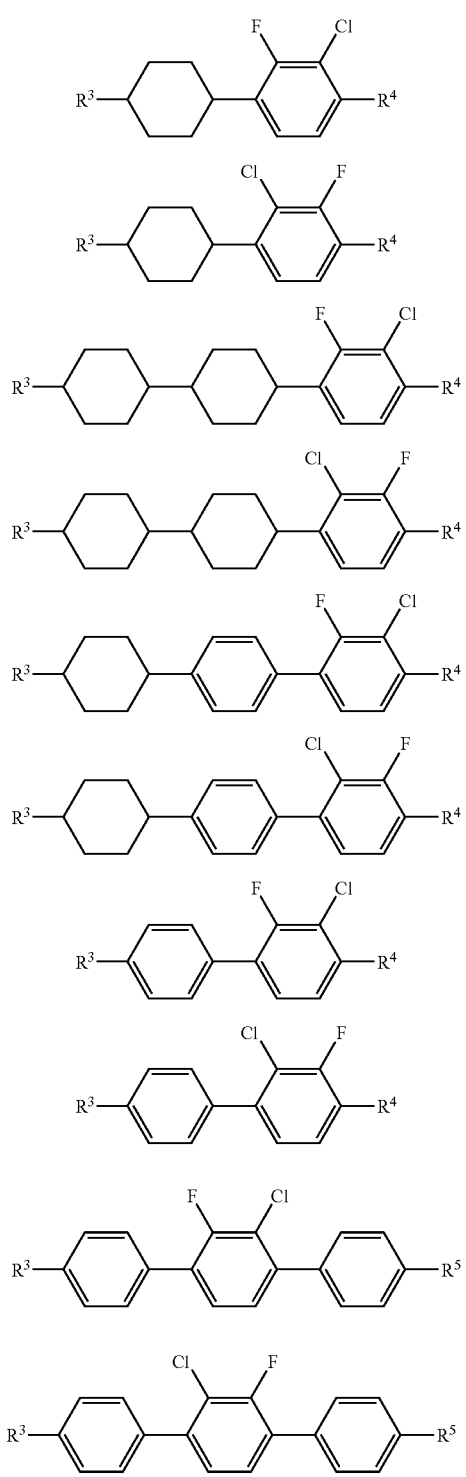

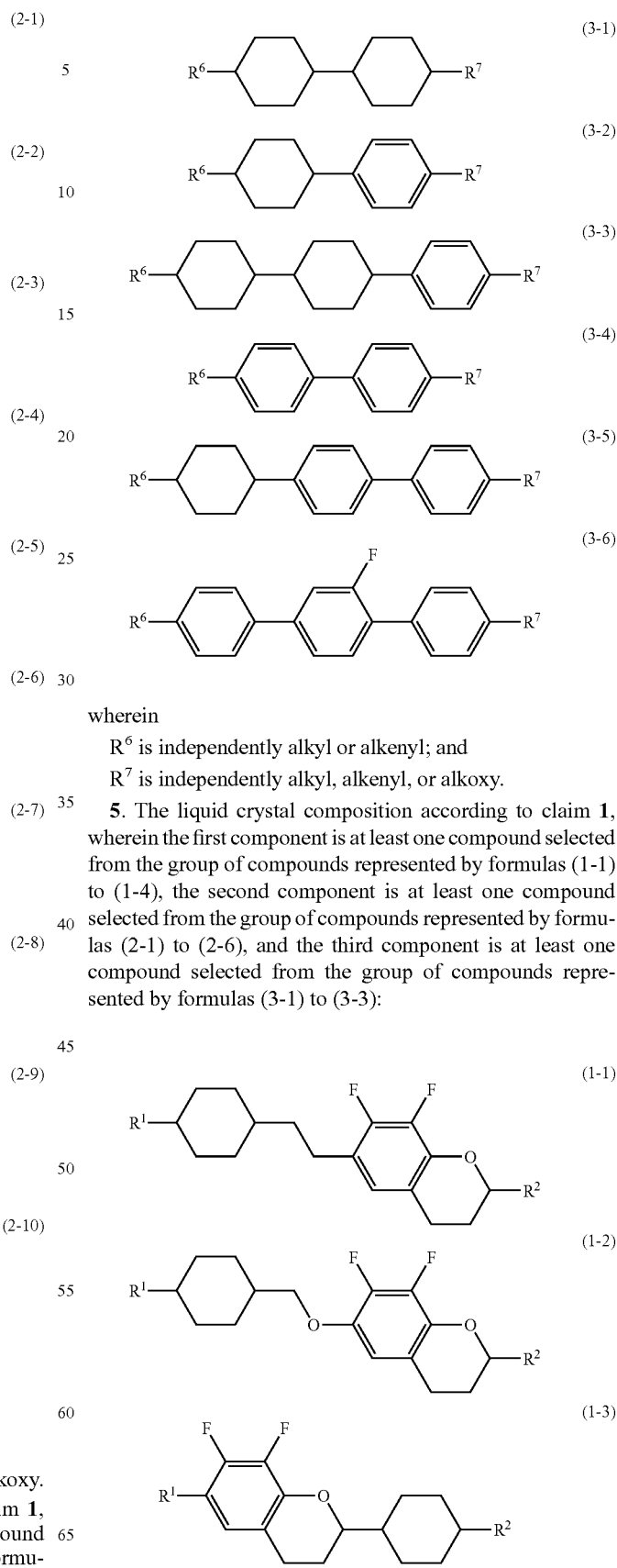

wherein

R³ is independently alkyl or alkenyl; and

R⁴ and R⁵ are each independently alkyl, alkenyl, or alkoxy.

4. The liquid crystal composition according to claim 1, wherein the third component is at least one compound selected from the group of compounds represented by formulas (3-1) to (3-6):

wherein

R⁶ is independently alkyl or alkenyl; and

R⁷ is independently alkyl, alkenyl, or alkoxy.

5. The liquid crystal composition according to claim 1, wherein the first component is at least one compound selected from the group of compounds represented by formulas (1-1) to (1-4), the second component is at least one compound selected from the group of compounds represented by formulas (2-1) to (2-6), and the third component is at least one compound selected from the group of compounds represented by formulas (3-1) to (3-3):

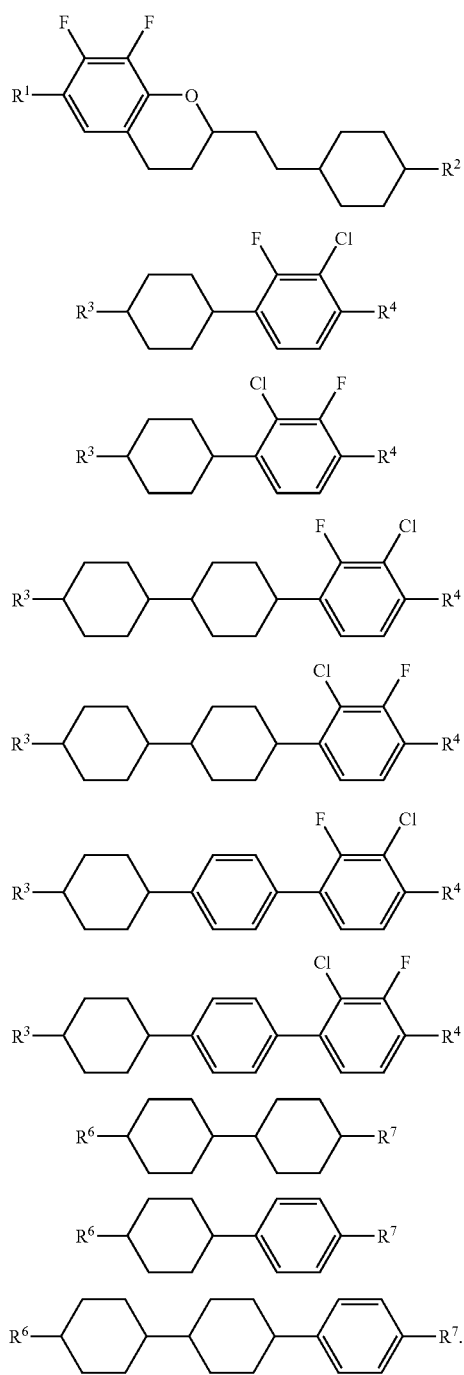

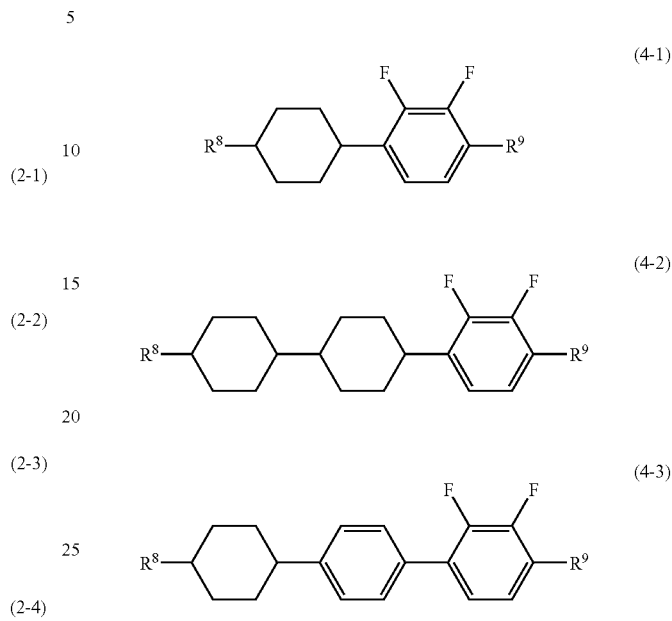

compounds represented by formulas (4-1) to (4-3) as a fourth component in addition to the first component, the second component and the third component:

wherein

R⁸ is independently alkyl or alkenyl; and

R⁹ is independently alkyl, alkenyl, or alkoxy.

8. The liquid crystal composition according to claim 7, wherein the first component is at least one compound selected from the group consisting of compounds represented by formulas (1-1) to (1-4), the second component is at least one compound selected from the group of compounds represented by formulas (2-1) to (2-4), the third component is at least one compound selected from the group consisting of compounds represented by formulas (3-1) to (3-3), and the fourth component is at least one compound selected from the group of compounds represented by formulas (4-1) and (4-2):

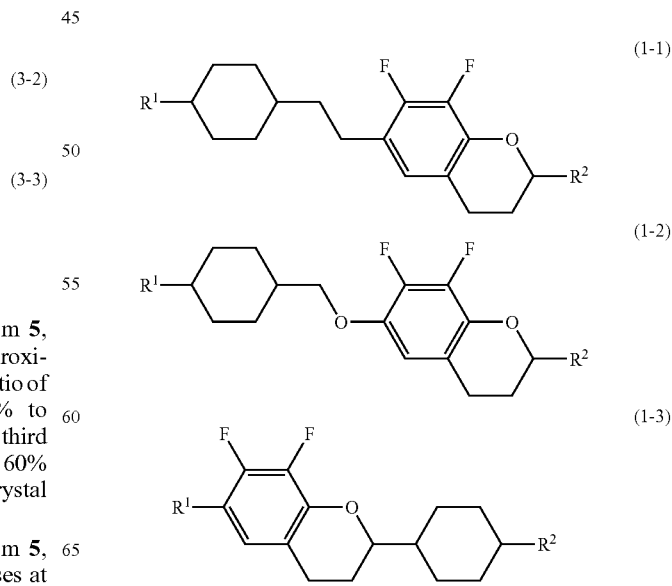

6. The liquid crystal composition according to claim 5, wherein a content ratio of the first component is from approximately 2% to approximately 40% by weight, a content ratio of the second component is from approximately 10% to approximately 80% by weight, and a content ratio of the third component is from approximately 5% to approximately 60% by weight, based on the total weight of the liquid crystal compounds.

7. The liquid crystal composition according to claim 5, wherein the liquid crystal composition further comprises at least one compound selected from the group consisting of -continued

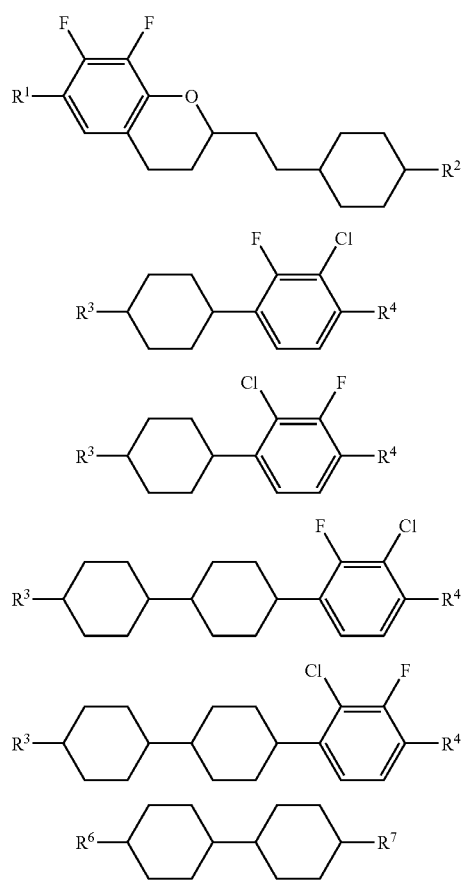

(1-4)
(2-1)
(2-2)
(2-3)
(2-4)
(3-1)

-continued

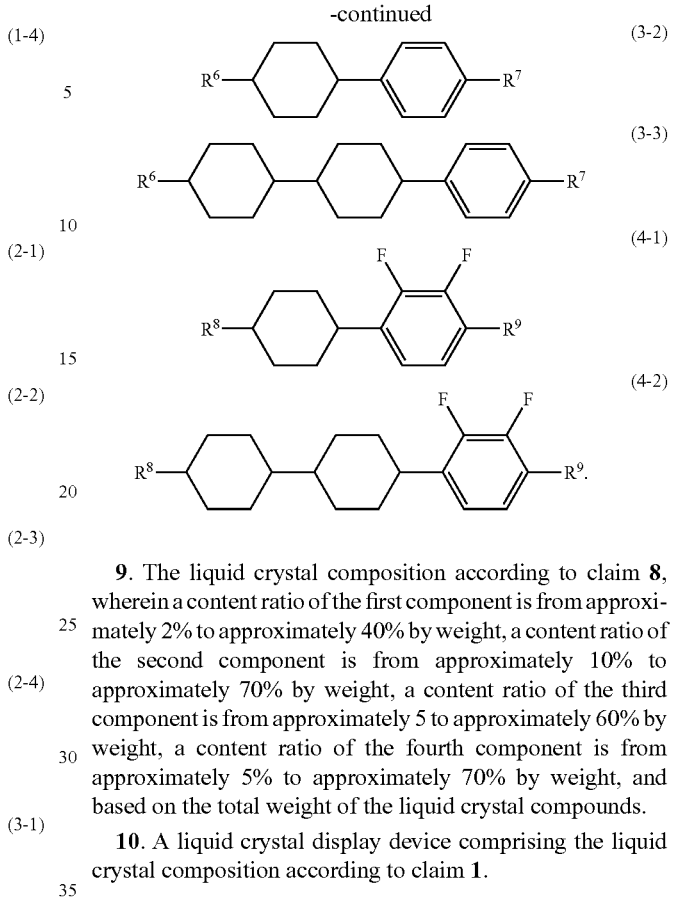

(3-2)
(3-3)
(4-1)
(4-2)

9. The liquid crystal composition according to claim 8, wherein a content ratio of the first component is from approximately 2% to approximately 40% by weight, a content ratio of the second component is from approximately 10% to approximately 70% by weight, a content ratio of the third component is from approximately 5 to approximately 60% by weight, a content ratio of the fourth component is from approximately 5% to approximately 70% by weight, and based on the total weight of the liquid crystal compounds.

10. A liquid crystal display device comprising the liquid crystal composition according to claim 1.

* * * * *